United States Patent
Devins et al.

(10) Patent No.: US 7,176,927 B2
(45) Date of Patent: Feb. 13, 2007

(54) METHOD AND SYSTEM FOR GRAPHICS RENDERING USING HARDWARE-EVENT-TRIGGERED EXECUTION OF CAPTURED GRAPHICS HARDWARE INSTRUCTIONS

(75) Inventors: Robert J. Devins, Essex Junction, VT (US); Paul M. Schanely, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 10/665,289

(22) Filed: Sep. 22, 2003

(65) Prior Publication Data

US 2004/0054834 A1    Mar. 18, 2004

Related U.S. Application Data

(63) Continuation of application No. 09/283,387, filed on Mar. 31, 1999, now Pat. No. 6,762,761.

(51) Int. Cl.
*G06F 15/16* (2006.01)
*G06F 15/00* (2006.01)
*G09G 5/36* (2006.01)

(52) U.S. Cl. .................. 345/503; 345/501; 345/553
(58) Field of Classification Search ................ 345/503, 345/522, 545, 553, 501, 534, 537, 539, 556, 345/559, 565, 530
See application file for complete search history.

(56) References Cited

U.S. PATENT DOCUMENTS

| | | | |
|---|---|---|---|
| 5,159,665 A | 10/1992 | Priem et al. | |
| 5,265,203 A | 11/1993 | Peaslee et al. | |
| 5,276,798 A | * 1/1994 | Peaslee et al. | .............. 345/505 |
| 5,301,287 A | 4/1994 | Herrell et al. | |
| 5,511,154 A | 4/1996 | Johnson et al. | |
| 5,706,478 A | * 1/1998 | Dye | ........................... 345/503 |
| 5,727,192 A | 3/1998 | Baldwin | |
| 5,754,750 A | 5/1998 | Butterfield et al. | |
| 5,798,770 A | 8/1998 | Baldwin | |
| 5,969,728 A | 10/1999 | Dye et al. | |
| 6,084,599 A | 7/2000 | Nakatsuka et al. | |
| 6,226,695 B1 | 5/2001 | Kaiser et al. | |
| 6,339,427 B1 | 1/2002 | Laksono et al. | |

OTHER PUBLICATIONS

Specification and Drawings for Unpublished U.S. Appl. No. 09/283,386, 28 pages.

* cited by examiner

*Primary Examiner*—Kee M. Tung
*Assistant Examiner*—Joni Hsu
(74) *Attorney, Agent, or Firm*—Connolly Bove Lodge & Hutz LLP; Richard M. Kotulak; Larry J. Hume

(57) ABSTRACT

A computer-implemented method and system for performing graphics rendering on demand on a graphics subsystem, with only nominal host system operations being required. High-level specifications of graphics operations in a computer program are captured as I/O hardware programs in a memory. A graphics processor in the subsystem issues instructions in the captured programs to a graphics accelerator, which executes the instructions to perform graphics operations. The graphics accelerator has a status indicator containing status information relating to hardware events incident to the graphics operations. Under the control of instructions in the captured program, the graphics processor monitors the status indicator, and either issues, or delays issuing, the instructions in the captured programs, depending upon the status information in the indicator.

9 Claims, 5 Drawing Sheets

METHOD AND SYSTEM FOR GRAPHICS RENDERING USING HARDWARE-EVENT-TRIGGERED EXECUTION OF CAPTURED GRAPHICS HARDWARE INSTRUCTIONS

CROSS-REFERENCE TO RELATED APPLICATIONS

This application is related to Applicant's co-pending U.S. patent application Ser. No. 09/283,386, assigned to International Business Machines Corporation, having a common ownership.

This application is a Continuation of U.S. patent application Ser. No. 09/283,387, filed on Mar. 31, 1999 now U.S. Pat. No. 6,762,761 by Devins, et al. entitled METHOD AND SYSTEM FOR GRAPHICS RENDERING USING HARDWARE-EVENT-TRIGGERED EXECUTION OF CAPTURED GRAPHICS HARDWARE INSTRUCTION, the entire contents of which are incorporated by reference, and for which priority is claimed under 35 U.S.C. §120.

BACKGROUND OF THE INVENTION

The present invention relates to computer graphics systems, and in particular to a method and system for increasing graphics rendering speed and efficiency by offloading rendering operations from a host processor onto a register-based graphics subsystem which can perform graphics rendering on demand with only nominal host processor operations being required.

Generally, computer graphic images are produced by transferring pixel definitions (intensity and color), stored in a memory location known as a frame buffer, to a display screen. Presently, most display systems are raster-based, which means that a value stored in the frame buffer determines the intensity and color of an electron beam at a given pixel, as the beam scans the phosphor-coated inner surface of a display screen at a suitable frequency.

The process of transforming a set of image definitions in program code into a set of pixel values which can be physically displayed on a CRT, and subsequently scanning the pixel values onto a CRT, is often referred to as "rendering". In rendering, a processor must take specifications of graphical primitives, which are the basic building blocks for more complex images, from within an application program and convert them into pixel definitions.

Application programs requiring graphics operations to be performed typically call basic rendering functions for rendering primitives, such as lines, circles and polygons. These basic rendering functions are written in low-level code and reside in a graphics library. A set of basic rendering functions is known as an Application Programmer's Interface (API), and allows programmers to write graphics applications in a high-level language such as C or Fortran in terms of these basic functions, without the need for writing low-level code. Some standardized and commercially-available API's include OpenGL, PHIGS (Programmers Hierarchical Graphics Standard), and GKS (Graphical Kernel System).

In order for an image to be rendered, the high-level API specifications within an application program must be interpreted and reduced to hardware-level code. Then, this hardware-level code must be executed to perform the actual physical I/O operations required to fill or modify a frame buffer.

Even with simple images, these tasks can consume significant portions of processor time and system memory. However, graphics applications are becoming increasingly more sophisticated, requiring complex, realistic images to be rendered in color, with lighting, shadow and the like. If certain images are required to be generated repetitively, for example, in the case of a video game, the high demands on processor time and system memory can slow image rendering and frustrate users.

Thus, an approach to rendering is called for that can offload repetitive tasks from a host processor, freeing it to perform other necessary tasks. Specifically, host processor cycles and memory would be conserved, and rendering speed increased, if the host processor operations required to generate hardware-executable instructions from high-level API specifications in a graphics application program could be performed just once for an image required to be rendered repetitively, and the hardware-executable instructions could subsequently be executed on demand to render the image. Such an approach is not known to exist in the prior art.

In the aforesaid related application Ser. No. 09/283,386, assigned to International Business Machines Corporation, having a common inventorship), which is herein incorporated by reference, there is disclosed a method and system for capturing in a memory as an executable program, the hardware instructions to graphics hardware generated by the basic rendering functions called by a graphics application program. Once the hardware instructions are captured, they can be executed on a graphics subsystem to render an image upon demand with only nominal host processor operations being required.

Host processor cycles would further be conserved if hardware interrupt servicing related to graphics operations normally performed by a host processor could be offloaded to a graphics subsystem in a programmable way, i.e., by specifying within a graphics application program, particular hardware interrupt handling routines to be performed by a graphics subsystem rather than the host processor. The method and system according to the related application described above enables such an approach to hardware interrupt handling in graphics operations, which is not known to exist in the prior art.

SUMMARY OF THE INVENTION

The present invention provides a method and system for offloading rendering tasks from a host processor to a graphics subsystem which can perform the rendering tasks on demand. A memory is provided which contains captured I/O hardware programs generated by high-level specifications of graphics operations in a computer program. The captured programs are generated and stored in the memory according to the method and system disclosed in the related application described above.

There is further provided a graphics processor which fetches instructions in the captured program and issues them to a graphics accelerator, which executes the intructions to perform graphics operations. The graphics accelerator includes status registers containing status information relating to the graphics operations performed by the accelerator.

A captured program may include instructions for causing the graphics processor to monitor the status information in a status register, and delay issuing instructions in the captured program to the accelerator until specified status information is present in the status register.

The ability to cause the captured programs to execute responsively to the status information allows a programmer to link graphics operations to specific hardware events represented by the status information. Thus, a programmer can code a graphics application to execute graphics operations without initiating host processor hardware interrupt handling routines, by monitoring the status indicator in the graphics accelerator and issuing hardware I/O instructions in the captured programs based on the status information in the indicator. Host processor cycles and memory are thereby conserved, and the efficiency of graphics operations is increased.

DETAILED DESCRIPTION OF THE INVENTION

Figure 1:
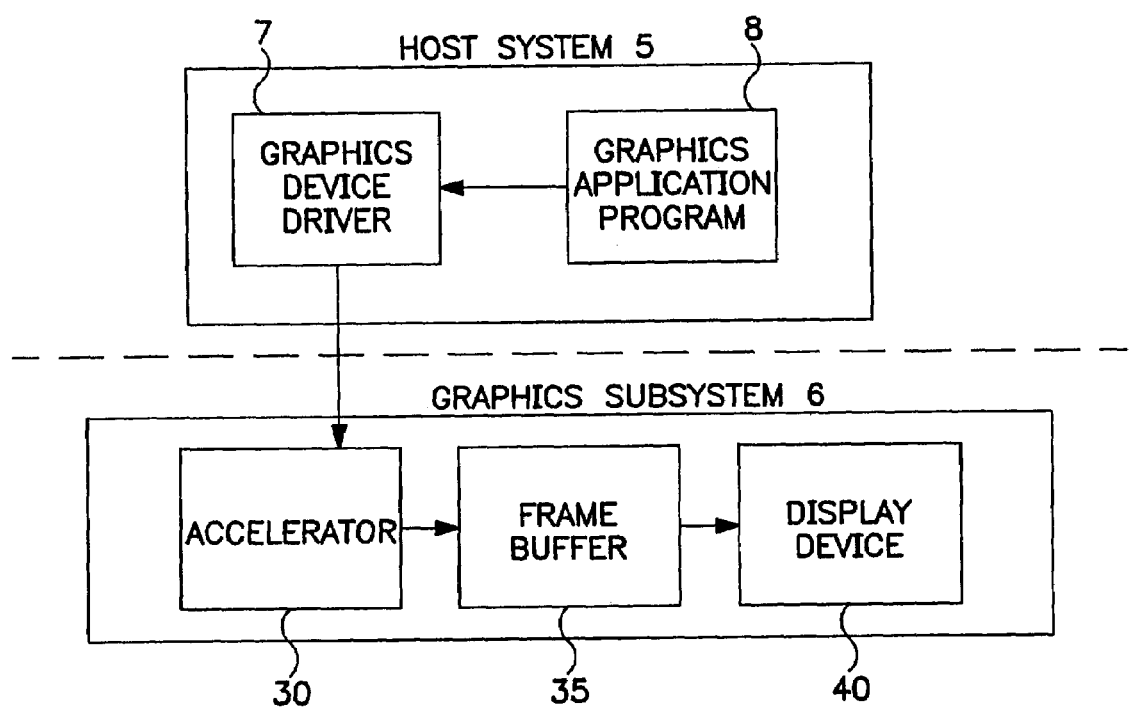
FIG. 1 shows a general overview of a prior art graphics rendering system.

FIG. 1 illustrates a conceptual overview of a prior art graphics rendering system. In the system shown in FIG. 1, a host operating system 5 has graphics device driver software 7, which, in response to high-level graphics rendering specifications in graphics application program 8, issues low-level instructions to graphics accelerator 30 in graphics subsystem 6. Under the control of the graphics device driver 7, accelerator 30 writes pixel definitions to frame buffer 35, which are scanned onto display device 40 to physically render an image.

In the system shown in FIG. 1, the hardware interrupts associated with graphics I/O operations are handled by the host processor in a conventional way. For example, in response to a hardware interrupt generated by display device 40, an interrupt service routine executed by the host may perform software polling of status flags in a device interface to determine the source of the interrupt and the type of servicing required by the device, which is usually to transfer the device more data. Alternatively, hardware polling or hardware vectoring may be used to handle the interrupt. In any case, the host system must do work to service the interrupt, and the graphics application must wait while the host system services the interrupt.

Figure 2:
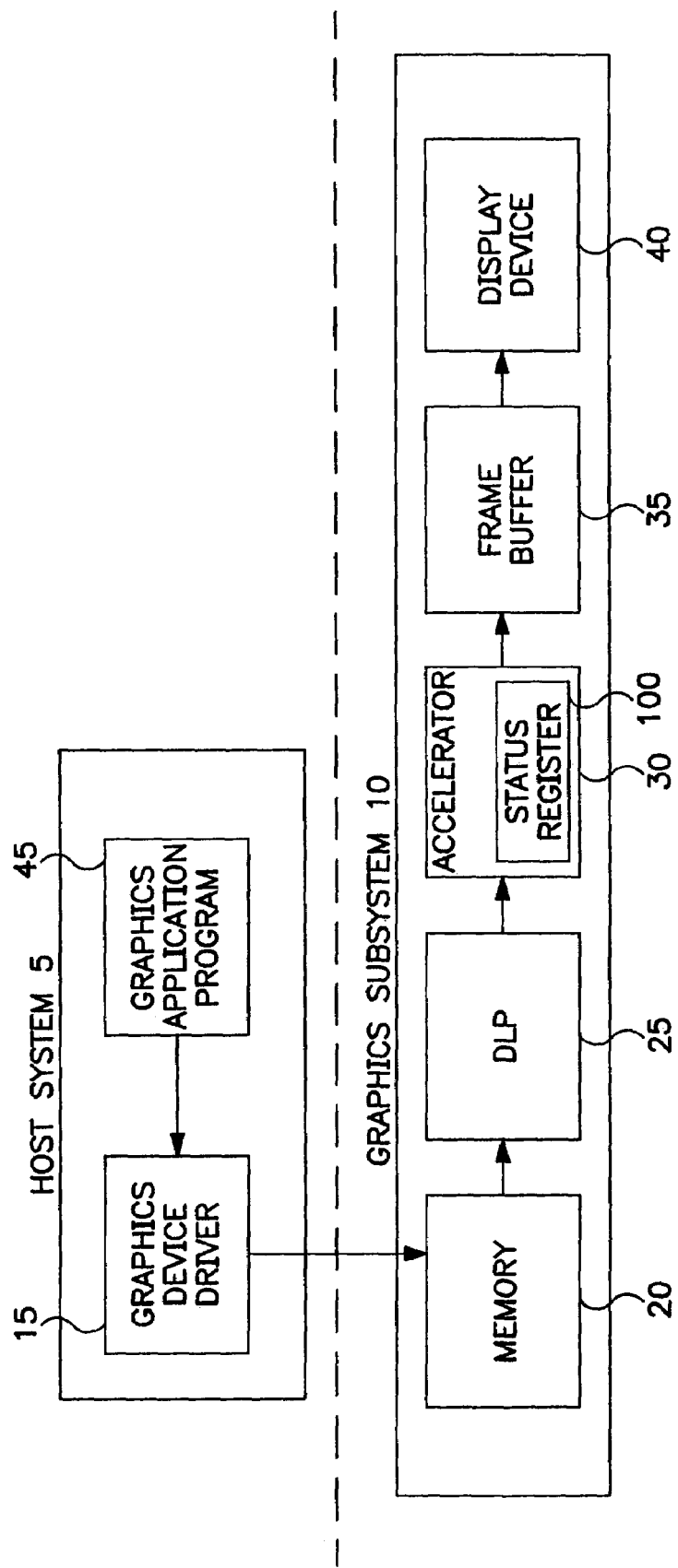
FIG. 2 shows the basic software and hardware components of a system for implementing the present invention.

By contrast, FIG. 2 shows basic software and hardware components in a method and system for graphics rendering according to the present invention, which, as explained in detail hereinafter, enables host processor work related to hardware interrupt processing to be offloaded to a graphics subsystem 10, comprising a random access memory 20, a custom graphics processor known as a Display List Processor (DLP) 25, an accelerator 30 having a status register 100 (to simplify the discussion, status register 100 represents what are, in the preferred embodiment, a plurality of status registers), a frame buffer 25, and a display device 40, such as a CRT. The DLP 25 is capable of fetching hardware instructions stored in memory 20, and issuing the instructions to control the accelerator 30. The DLP 25 is further capable of polling status bits in the status register 100, and of delaying the issuing of instructions in the memory 20 until specified status information is present in status register 100. The accelerator 30 includes high-speed registers that enable pixel definitions to be written to the frame buffer 35 in accordance with the instructions issued by DLP 25. The pixel definitions are then scanned from the frame buffer 35 onto the display device 40 to produce an image.

Figure 3:
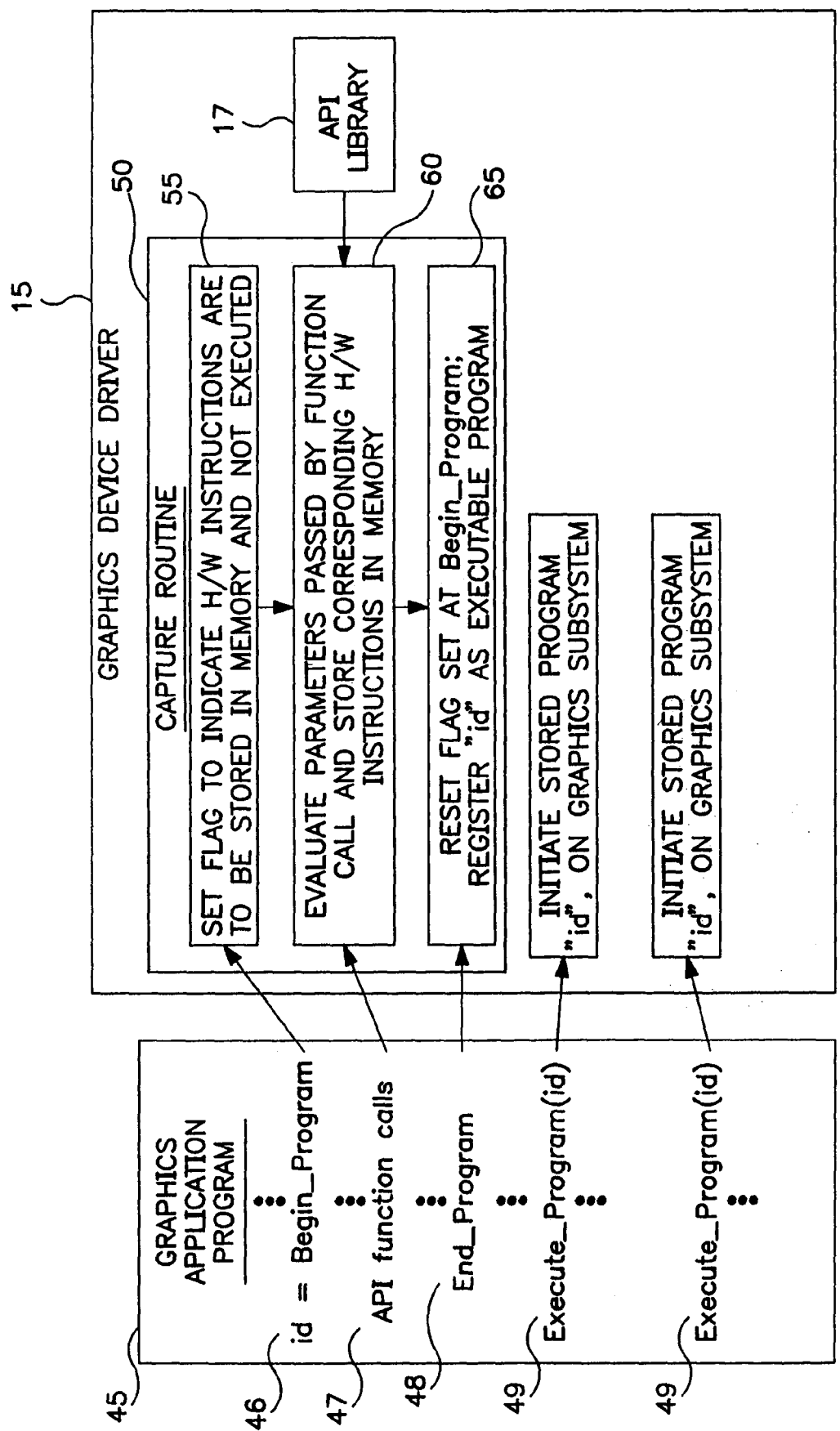
FIG. 3 shows the flow of a capture routine according to the present invention.

Referring now to both FIG. 2 and FIG. 3, computer-executable instructions for effecting the features of the present invention are implemented in the graphics device driver 15. The device driver 15 includes a capture routine 50 and an API set 17, which includes basic rendering functions for rendering primitives, and further includes I/O directives for causing the DLP 25 to monitor the status register 100 in accelerator 30, and delay execution of instructions in memory 20 until the status register contains specified status information. Each of the functions in the API comprises a sequence of computer-executable instructions at the hardware level. In the case of the I/O directives for causing the DLP 25 to delay execution of instructions in the memory 20, these hardware-level instructions comprise register read/mask/compare primitives the DLP executes to monitor status register 100, to decide whether to move on to the next instruction in the memory or not.

The functions in the API 17 may be invoked by instructions within higher-level programs, by specifying a function by its unique mnemonic identifier and passing it the appropriate user-defined parameters. For example, "wait_for_vsync" might represent a high-level call to a function within API 17 comprising instructions to the DLP 25 to delay execution of a captured program until status register 100 indicates that a "vsync" signal has been received from display device 40, indicating that the device is doing vertical retrace.

Capture routine 50 comprises computer-executable instructions for responding to instructions within a higher-level application program 45 executing on a host system 5, identifying a sequence of API function calls 47 to be pre-stored in a random access memory 20 as hardware instructions. The instructions within the higher-level program typically are coded by a programmer in an application program requiring graphics to be rendered, in order to invoke the advantageous features provided by the present invention.

The instructions in the higher-level application program 45 invoking the features of the invention comprise a "Begin_Program" 46 and "End_Program" 48 identifying pair, which enclose or bound a sequence of API function calls 47, coded by a programmer as calls by mnemonic identifier (along with required parameters) to particular functions within the API set 17 provided in the device driver 15. The Begin_Program/End_Program bounding pair identify an API sequence to be pre-stored in a memory 20 as hardware instructions.

When a Begin_Program instruction 46 in an application program 45 is executed, a function call is issued to the capture routine 50 in the device driver code 15. FIG. 3 shows the basic flow of the capture routine. The sequence shown is initiated by a Begin_Program instruction 46 within an application program 45. First, as shown in block 55, the capture routine sets a flag instructing the device driver 15 to store hardware instructions generated by API function calls 47 in memory 20, rather than executing the hardware instructions by issuing them to accelerator 30. Thus, as shown in block 60, API function calls 47 following the Begin_Program instruction 46 are evaluated to generate the corresponding hardware instructions, by passing programmer-specified parameters to the appropriate API in API library 17, and storing the API in memory 20. The API comprises fully machine-executable register instructions performing the particular function specified by the programmer in the call parameters.

The capture routine 50 performs the operations indicated in block 60 for each API function call 47. Then, as shown in block 65, when the application program 45 issues an End_Program instruction 48, the capture routine resets the flag set by the Begin_Program instruction 46, and registers the collective stored, hardware-executable instructions with the host system 5 as an executable program, using a unique mnemonic identifier, "id", arbitrarily assigned by the programmer in the Begin_Program instruction 46.

Once a bounded API sequence 47 is captured as an executable program on memory 20, it can be executed on demand by the graphics subsystem 10 by specifying its assigned mnemonic, "id", in an Execute_Program instruction 49. The Execute_Program instruction causes the DLP 25 to read the hardware instructions corresponding to "id" stored in memory 20, and issue the instructions to accelerator 30. The instructions may direct the accelerator 30 to render an image defined by a captured program, by writing pixel information to frame buffer 40, and may include instructions directing the DLP 25 to monitor status register 100 and delay the issuing of instructions in the memory 20 until specified status information is present in status register 100.

The present invention may be used to offload both periodic graphics operations and serial graphics operations from a host processor onto a graphics subsystem. Accelerator 30 includes status registers (represented generically by status register 100) which contain status information relating to graphics operations performed by the accelerator under the control of instructions in a captured program. The status registers also include status information relating to events on a hardware device external to accelerator 30, such as a display device 40. Hardware event interrupts associated with operations performed by captured programs are not delivered to the host system. Instead, by using the DLP 25 to monitor the status registers in the accelerator and issue instructions in the captured programs based on the status information, a programmer can link graphics operations to specific hardware events represented by the status information. Thus, a programmer can code a graphics application to execute graphics operations without initiating host processor hardware interrupt handling routines.

The following is an illustrative example of an application of the present invention where a programmer wants to have the graphics subsystem 10, rather than host system 5, perform display buffer address swapping.

Display buffer address swapping refers to a periodic process which occurs in graphics I/O operations. On computer screens (CRT's) or televisions, there is a timing signal called VSYNC, or VBLANK, which activates whenever the screen is doing vertical retrace and is effectively blank. It is desirable to execute graphics operations during this period in order to provide a smooth visual effect in the CRT display. Often, two graphics buffers are used to form displays: one buffer where the active pixel data is being fetched from, and one buffer where new pixels are being formed. At VSYNC, the buffers are swapped, so the new pixels are displayed, and the old display buffer is available for new pixels.

Swapping is a periodic function which happens every VSYNC. Swapping is accomplished by writing a new display buffer address into a register in the accelerator, which the display hardware reads to determine which is the current display buffer. Normally, swapping is performed by a host system 5, and requires processor cycles to field a VSYNC interrupt and write the new buffer address. Offloading this task to the graphics subsystem 10 saves interrupt processing by the host processor.

To effect the offloading, the programmer would typically work on a computer system including a host processor, memory, read/write disk storage, and I/O devices such as a keyboard and mouse allowing for user interaction with the operating system and software applications, including text editors for writing and editing software. The programmer would use a text editor to write or edit source code containing instructions recognizable by the device driver software of the present invention, for capturing a swapping program. To implement the present invention, the computer system would typically further require a graphics subsystem including the components illustrated in FIG. 2.

In the source code for capturing a swapping program, the programmer would typically write program instructions defining a Begin-Program/End-Program pair to bound a sequence of API functions for performing swapping. For example, pseudo-code for bounding a sequence of API functions for performing swapping might look as follows:

```
swap = Begin_Program();      // define a captured program to
                             // perform display buffer
                             // address swapping;
start;                       // define starting point for periodic
                             // routine
wait_for_sync;               // instruct the DLP 25 to monitor
                             // status register 100 for a vsync
                             // signal;
write_pointer1_to_display;   // define frame buffer 1 as current
                             // display buffer;
wait_for_sync;               // instruct the DLP 25 to monitor
                             // status register 100 for a vsync
                             // signal;
write_pointer2_to_display;   // define frame buffer 2 as current
                             // display buffer
jump_to_start;               // end routine and restart at first
                             // wait_for_sync
End_Program();               // save the hardware instructions for
                             // display buffer address swapping in
                             // memory 20 and register with
                             // host system 5 as
                             // executable program;
```

In this example, the instructions "swap=Begin_Program( )" and "End_Program( )" define a sequence of API functions to be captured as an executable program on a memory 20. When executed, the instructions will create a captured hardware-level program called "swap" which will perform display buffer address swapping without host processor intervention.

For purposes of the following discussion, a captured program comprises a sequence of operations which may include executing operations of another captured program.

Figure 4:
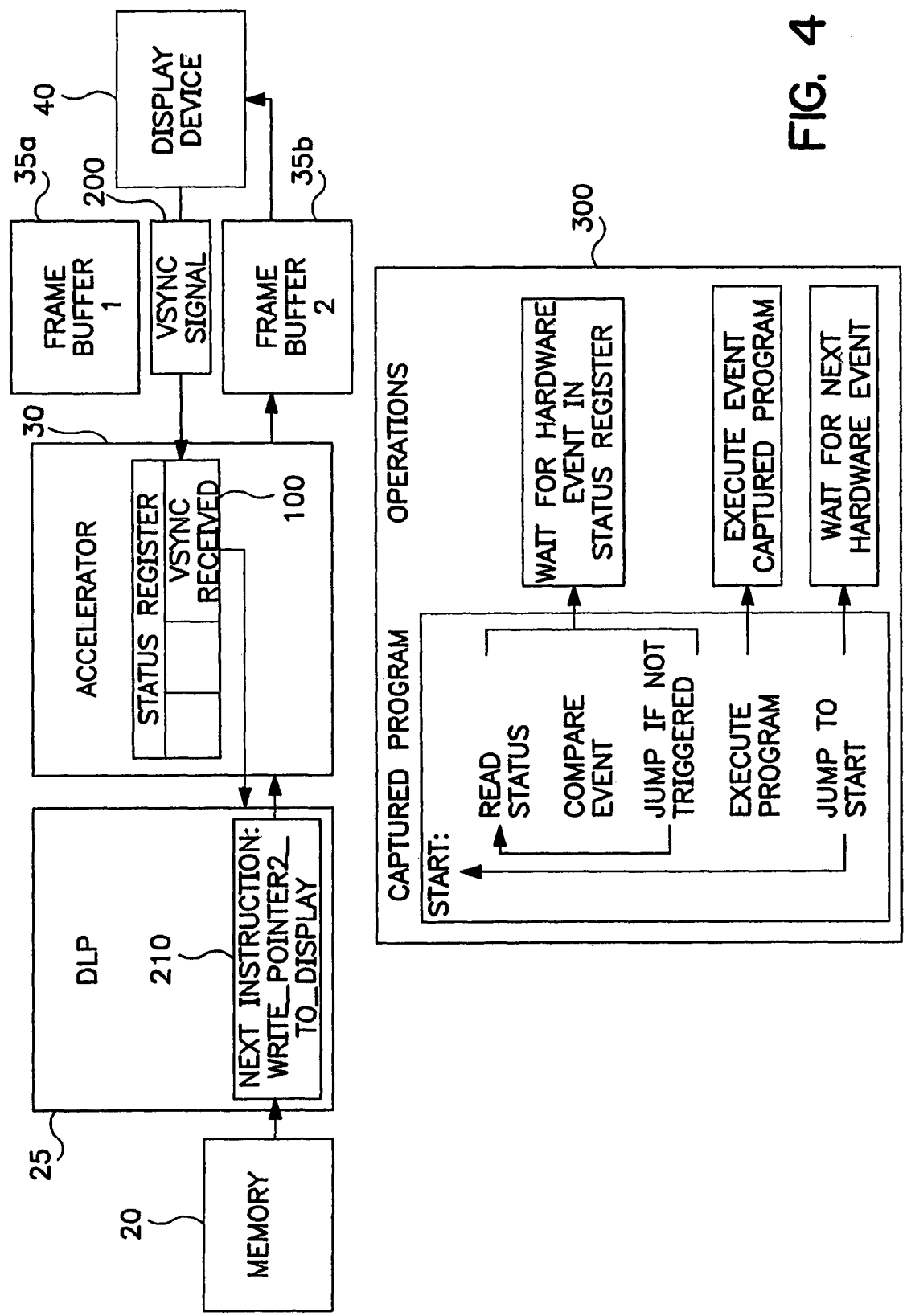
FIG. 4 shows an example of an application program utilizing the present invention.

The execution of captured program "swap" is illustrated in FIG. 4. Diagram 300 shows the basic logic flow of "swap", and is applicable to any captured program which performs an operation periodically. The program executes by continously polling for a triggering event in a hardware status register, as shown in the Read Status→Compare Event→Jump If Not Triggered sequence. If the polling shows that the triggering event has occurred, the operations to be performed at the event are executed, and then the program returns to the event trigger wait, by polling with the Read Status→Compare Event→Jump If Not Triggered sequence.

FIG. 4 shows the operations that occur under the control of the "swap" example program instructions, "wait_for- _vsync" and "write_pointer2_to_display". The current display buffer is frame buffer 1 (35a), and the "wait_for_vsync" instruction in the "swap" program stored on memory 20 causes the DLP 25 to poll status register 100 in accelerator 30. If status register 100 does not show that a VSYNC signal 200 has been received, polling continues, with the DLP 25 continuously performing the Read Status→Compare Event→Jump If Not Triggered sequence.

Then, during vertical retrace, display device 40 generates the VSYNC hardware interrupt 200, which is registered in status register 100. The polling by DLP 25 detects that VSYNC has been received, and consequently the DLP 25 issues the "write_pointer2_to_display" 210 instruction stored on memory 20 to the accelerator 30, which executes the instruction to write the address of frame buffer 2 (35b) to a register which is readable by display hardware. Frame buffer 2 becomes the current display buffer, and the pixels in frame buffer 2 are scanned onto display device 40 to produce an image. The "swap" routine restarts at the first wait_for_sync, writes the address of frame buffer 1 at the next VSYNC, and so on; the routine is repeated indefinitely. Thus, the "swap" routine performs display buffer address swapping without host processor intervention.

The following is an illustrative example of an application of the present invention where a programmer wants to offload graphics operations which are serial onto a graphics subsystem 10.

The display of text is typically a serial operation which is performed by copying the character patterns, or bitmaps, from font storage to the active display, under the control of a program specifying which characters are to be displayed. Characters are moved by a BLT (bit-logical-transfer) engine in the accelerator 30. The BLT operations are serial; i.e., each BLT operation must complete before the next one can be started.

Normally, host processor work is required in BLT operations, for fielding a hardware interrupt generated by the completion of a BLT operation, and executing the instructions for specifying to the accelerator 30 which character to copy from font storage, and where in the frame buffer 35 the character is to be placed. Captured programs can offload these tasks from the host processor to more efficiently display a block of characters, as illustrated in the following pseudo-code:

| | |
|---|---|
| moveblock = Begin_Program(); | // define a captured program to move |
| | // a block of characters; |
| execute_blt ("A"); | // instruct accelerator 30 to copy |
| | // character "A" from font storage |
| | // to frame buffer 35; |
| wait_for_blt_complete; | // instruct the DLP 25 to monitor |
| | // status register 100 for a |
| | // "BLT complete" signal; |
| execute_blt ("B"); | // instruct accelerator 30 to copy |
| | // character "B" from font storage |
| | // to frame buffer 35; |
| wait_for_blt_complete; | // instruct the DLP 25 to monitor |
| | // status register 100 for a |
| | // "BLT complete" signal; |
| execute_blt ("C"); | // instruct accelerator 30 to copy |
| | // character "C" from font storage |
| | // to frame buffer 35; |
| wait_for_blt_complete; | // instruct the DLP 25 to monitor |
| | // status register 100 for a |
| | // "BLT complete" signal; |
| End_Program(); | // save the hardware instructions for |
| | // moving a block of characters in |
| | // memory 20 and register with |
| | // host system 5 as |
| | // executable program; |

In this example, the instructions "moveblock=Begin_Program( )" and "End_Program( )" define a sequence of API functions to be captured as an executable program on a memory 20. When executed, the instructions will create a captured hardware-level program called "moveblock" which will move a block of text characters without host processor intervention.

Figure 5:
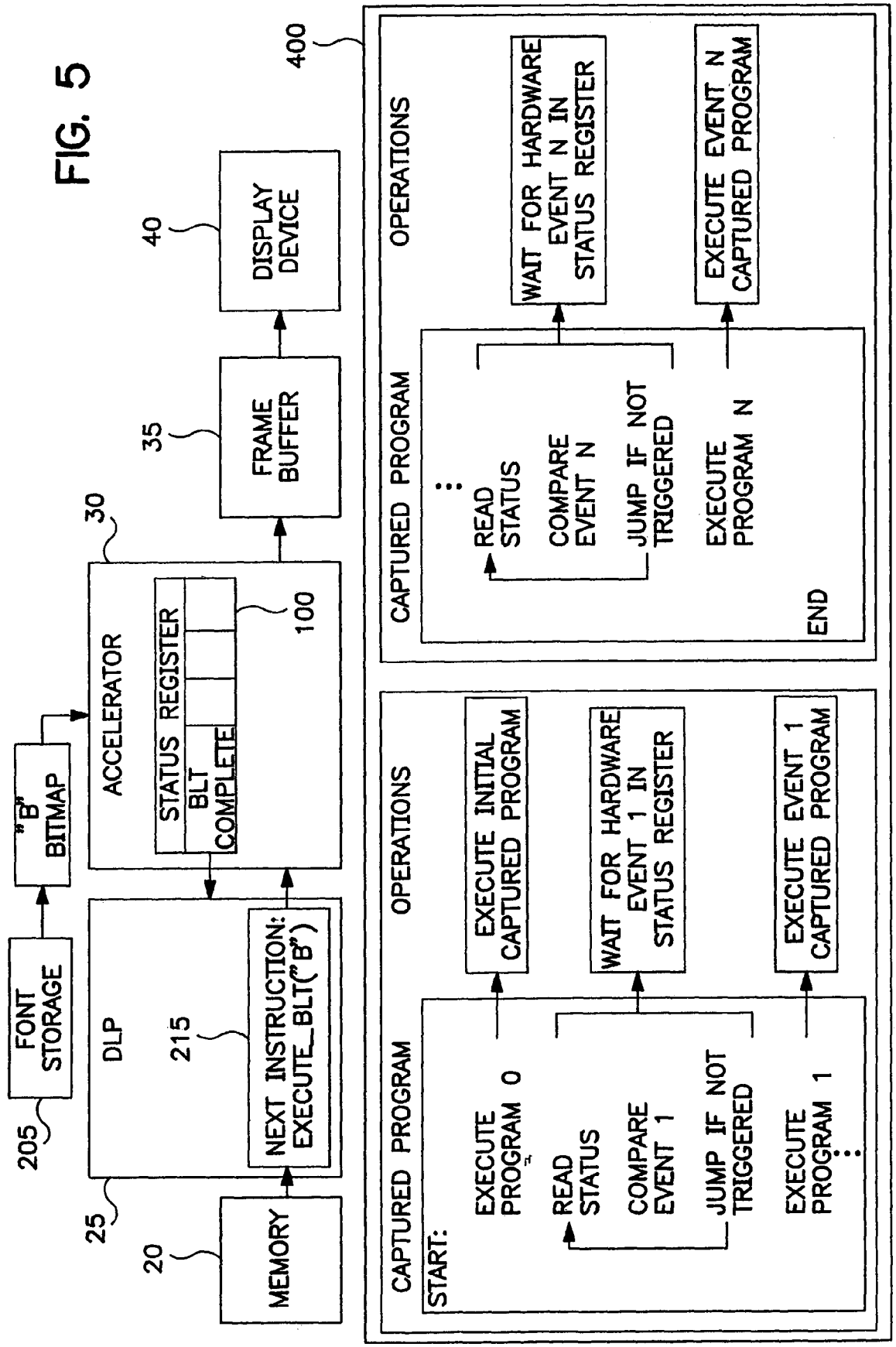
FIG. 5 shows an example of an application program utilizing the present invention.

The execution of captured program "moveblock" is illustrated in FIG. 5. Diagram 400 shows the basic logic flow of "moveblock", and is applicable to any captured program which performs an operation serially. The program executes by performing an initial operation of N+1 serial operations, and then polling for a first triggering event in a hardware status register, as shown in the Read Status→Compare Event→Jump If Not Triggered sequence. If the polling shows that the triggering event has occurred, the operations to be performed at the event are executed, and then the program begins polling for the next triggering event. When all the triggering events have occurred and all the operations dependent on those triggering events have been executed, the program ends.

FIG. 5 shows the operations that occur under the control of the "moveblock" example program instructions, "wait_for_blt_complete" and "execute_blt("B")". FIG. 5 represents the conditions after the character "A" has been copied from font storage 205 to the frame buffer 35 by accelerator 30, under the control of the instructions in captured program "moveblock" in memory 20, issued by DLP 25. The first "wait_for_blt_complete" instruction caused DLP 25 to poll for the "BLT complete" signal in status register 100, by continuously performing the Read Status→Compare Event→Jump If Not Triggered sequence. Then, when accelerator 30 completed the BLT operation for character "A", it registered this status in status register 100. The polling by DLP 25 detected the "BLT complete" signal, and consequently DLP 25 issued the next instruction in the "moveblock" captured program, "execute_blt("B")" (215).

An approach similar to that described in this example could be used, for example, to efficiently scroll pages of text on a display screen without host processor intervention. In addition, this approach could be used to perform serial rendering operations such as line drawing, or to synchronize the rendering of components of a complex scene using simpler subscenes rendered by captured programs. The foregoing feature is described in detail in the related application mentioned above.

The inventive concept described in the foregoing is not limited to graphics operations. It is appropriate for any system that requires repeated activity at periodic times. For example, a communications device such as a Universal Asynchronous Receiver Transmitter (UART) could include a captured program that is launched whenever the receiver data buffer is full. Such a program could unload the data into a larger memory buffer, and post an interrupt to the host processor whenever the larger memory buffer is full. This technique would effectively increase the UART buffer size without requiring new hardware.

Moreover, a UART data transmission program could be set up similarly to the "moveblock" example above. A captured program could poll for the condition of the transmitter buffer being empty. Then, another captured program that moves data from a memory buffer to the transmitter buffer could be launched, without host intervention. Only when the memory buffer was depleted would the captured program interrupt the host, to request more transmit data.

As described earlier, the present invention may advantageously be embodied as computer-executable instructions within a graphics device driver of a graphics subsystem. For implementation, the device driver code may reside on any computer-usable medium at a suitable location, for example, in a computer memory as a fully-linked subroutine of a host operating system. When not being actively implemented, the code may reside on portable computer-usable media such as tape, floppy disks, hard disks, CD-ROMs and the like.

The foregoing description of the invention illustrates and describes the present invention. Additionally, the disclosure shows and describes only the preferred embodiments of the invention, but it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A method for offloading hardware interrupt processing from a host system to a subsystem comprising:
    capturing, in a subsystem memory, hardware instructions generated by high-level specifications of operations in a computer program;
    generating an executable program from the captured hardware instructions and storing the executable program in the subsystem memory;
    utilizing a subsystem processor to execute the executable program with subsystem hardware without hardware interrupt processing by the host system;
    wherein said subsystem hardware includes a status indicator containing status information relating to a plurality of operations being carried out on said subsystem hardware,
    wherein said subsystem processor monitors said status indicator and issues said captured instructions in response to said status information.

2. The method of claim 1 wherein said captured programs include an instruction for causing said subsystem processor to delay issuing instructions in said captured programs until said status indicator contains specified status information.

3. The method of claim 2 wherein said specified status information relates to the completion of a specified operation.

4. The method of claim 3 wherein said operation is repeated periodically.

5. The method of claim 3 wherein said operation is one of a plurality of operations which are performed serially.

6. A computer system suitable for graphics rendering, comprising:
    a host system including at least a CPU and a system memory, said host system providing hardware instructions generated by high-level graphics operations executed by the host system;
    a graphics subsystem operatively coupled to the host system,
    wherein said graphics subsystem contains a display list processor operatively connected to a graphics accelerator,
    wherein said graphics accelerator includes a plurality of status registers which each indicate a status of a different one of a plurality of graphics operations,
    wherein said graphics subsystem receives the hardware instructions provided by the host system,
    wherein said graphics subsystem uses the hardware instructions to generate an executable program that is stored in a subsystem memory, and
    wherein hardware interrupt generation and handling is accomplished by the graphics subsystem and not by the CPU.

7. The computer system of claim 6, wherein at least one of the plurality of graphics operations are operations carried out by the graphics accelerator.

8. The computer system of claim 6, wherein at least one of the plurality of graphics operations are operations carried out by a hardware device external to the graphics accelerator.

9. The computer system of claim 6, wherein the plurality of graphics operations are serial operations.

* * * * *